United States Patent [19]

Tutty

[11] 4,339,275

[45] Jul. 13, 1982

[54] COLOR DEVELOPABLE COMPOSITION

[75] Inventor: Geoffrey C. Tutty, Christchurch, New Zealand

[73] Assignee: INCA Limited, Christchurch, New Zealand

[21] Appl. No.: 79,258

[22] Filed: Sep. 27, 1979

Related U.S. Application Data

[63] Continuation-in-part of Ser. No. 930,013, Aug. 1, 1978, abandoned.

[30] Foreign Application Priority Data

Feb. 23, 1979 [FR] France ............................... 79 04644

[51] Int. Cl.[3] ............................................. C09D 11/00

[52] U.S. Cl. .................................. 524/255; 282/27.5; 427/150; 427/151; 428/488; 106/21; 524/159; 524/88; 524/157

[58] Field of Search ................ 106/14.5, 21; 282/27.5; 260/33.6 R; 427/150, 151; 428/488

[56] References Cited

U.S. PATENT DOCUMENTS

| | | | |
|---|---|---|---|
| 3,952,129 | 4/1976 | Matsukawa et al. | 106/21 |
| 4,180,405 | 12/1979 | Lawton | 106/21 |

FOREIGN PATENT DOCUMENTS

| | | |
|---|---|---|
| 1354195 | 5/1974 | United Kingdom . |
| 1358405 | 7/1974 | United Kingdom . |

*Primary Examiner*—Lorenzo B. Hayes
*Assistant Examiner*—Amelia B. Yarbrough
*Attorney, Agent, or Firm*—Cushman, Darby & Cushman

[57] ABSTRACT

A composition for coating a substrate for use in an image wise developable or transferal system comprises (I) a free base of a cationic solvent dye capable of developing a color or at least a more intense color upon reaction with an organic acid developing compound and (II) a binder which is a wax or resin which does not develop said free base and which has been mixed with said free base in the presence of a non developing substantially non-polar solvent. Various forms of coating including the color developer composition in a layer or particulate form are applicable to different end uses.

14 Claims, 7 Drawing Figures

COLOR DEVELOPABLE COMPOSITION

CROSS REFERENCES TO RELATED APPLICATIONS

This is a continuation-in-part of my U.S. Ser. No. 930,013, now abandoned, which was filed on Aug. 1, 1978, now abandoned.

BACKGROUND OF THE INVENTION (1) Field of the Invention

The present invention has application in the field of the image wise development of images and is suitable where there is an application of pressure as in the case of no carbon required paper, the application of heat as in thermal image transferal systems and the selected image wise application of an electrical discharge.

(2) Description of the Prior Art

Within the field of image transferal it is known to use various dye precursors which are colourless or essentially colourless compounds and which undergo colour reaction when brought into contact with an acidic electronic acceptor material such as attapulgite, bentonite, benzoic acid and such like materials. Use has been made to produce colourless carbon papers and business manifold forms, thermally activated papers and various photographic systems. While many of these dye precursor imaging elements have been commercially successful they have, nevertheless, some disadvantages such as:

1. Precursors which develop the colour rapidly also tend to fade rapidly.

2. Fade resistant dye precursors are very slow at developing colours and are expensive.

3. Such dye precursors are difficult to dissolve and require expensive solvents.

4. The colour range is limited.

Typical of such systems are those of U.S. Pat. No. 4,012,554 which refers to any acid colourable basic chromogenic dye precursors of which the colour blocked triphenylmethane dyes are the best known (using for example potassium cyanide which converts the coloured dyestuff to colourless compounds) and British Patent No. 1,471,445 which deals with azo or azine dyes which are reactive dyestuffs of a different category.

Solvent dyestuffs of the type with which the present invention is concerned are the free bases of basic or cationic dyes. They are weakly coloured dyes which develop a stronger colour when reacted with a fatty acid. These dyes form a distinct class of oil soluble dyes. While reduction of a triphenylmethane dye will form a leuco base, the free base of basic cationic dyes (i.e. solvent dyes) including triphenylmethanes, xanthenes and etc. are formed by reacting the dyestuff with alkali.

BRIEF SUMMARY OF THE INVENTION

Present invention relates to compounds, compositions, coatings, solutions, dispersions, means and methods applicable to image wise transferal systems which utilise as a developable element in a colour developer composition a free base of a cationic solvent dye.

It is important to appreciate the distinction that the term "free base of a cationic colvent dye" has over previously used dyes. "Colour Index" produced by the Society of Dyers and Colourists of England and The American Association of Textile Chemists and Colourists of U.S.A., Second Edition 1956, Vol. 3 describes solvent dyes as being drawn from a number of chemical groups including xanthenes, triarylmethane, diphenylmethane, triphenylmethane, azo, azide and phenazine dyes. It further comments on their mode of use viz incorporation into the material to be coloured.

The following reaction layout for a triphenylmethane dye clearly distinguishes the free base of a cationic solvent dye from the other bases e.g. leuco base, carbinol base etc.

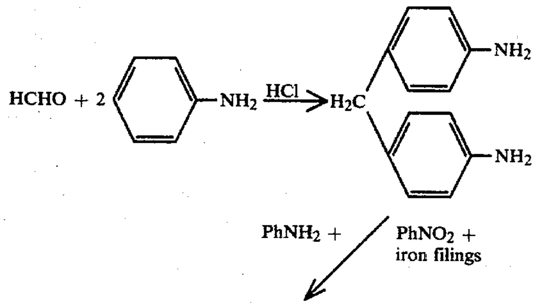

-continued

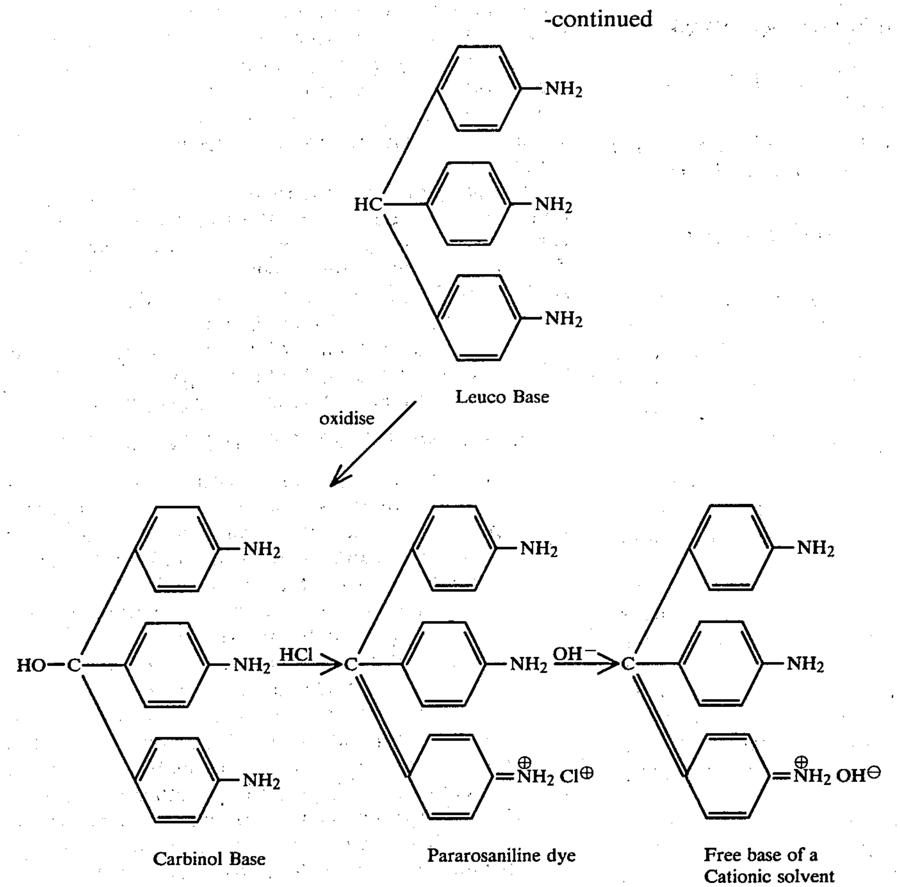

Leuco Base

Carbinol Base

Pararosaniline dye

Free base of a Cationic solvent dye

Dyes outside of the present invention that are presently used or have been used previously are bases chemically modified by the addition of leuco, carbinol, styryl, cyanide, benzopyrans and other organic groups which convert a normally coloured dye base into colourless materials. Examples of free bases of cationic solvent dyes in accordance with the present invention are the group of solvent dyestuffs which are the free bases of cationic solvent dyes including diphenylmethane, triphenylmethane, triarylmethane, xanthene and azo dyes and also the free bases of azine and phenazine dyes. These free bases are characterised by generally having poor solubility in most media but being highly soluble in fatty acids. They are also capable of producing a marked colour increase on reaction with acid and/or some polar solvents.

The present invention consists in a free base of a cationic solvent dye capable of developing a colour or a more intense colour upon reaction with an organic acid developing agent, a binder selected from the group consisting of waxes and resins which do not develop said free base, and an at least substantially non-polar solvent for both said binder and said free base which does not develope said free base.

The non developing solvent can be or have been substantially removed in some forms of the composition e.g. by spray drying.

The composition of the present invention assumes different forms. In one form the colour developer composition is particulate and is in combination with a carrier which is selected from the group consisting of a resin dispersion and a resin solution in which the composition is substantially insoluble. In an other form the colour developer composition covers a substrate such as a sheet of film which includes in contact therewith an organic acid developing agent for said substantially colourless solvent dye. Usually the developing agent is incorporated as a coating on a substrate transparent or opaque which is to be brought in use into an overlying relationship which the substrate on which the colour developer composition is coated, so that by selective electrical discharge, the application of pressure, heat or the like, the required developing reaction can occur. In some forms however it is possible to have a particulate form of the colour developer composition borne in a carrier which carrier also includes contained therein an organic acid developer for the free base of the cationic solvent dye. With this form of the invention it is desirable that the binder of the colour developer composition be substantially insoluble in the carrier. In other forms of the invention microencapsulated developers or solvents for the developing agent can be included so that upon rupture the required movement together of the organic acid developing agent and the free base of the cationic solvent dye occurs.

Preferred organic acid developing agents are substantially non crystalline and will not sublime at normal room temperatures, e.g. will melt or sublime within range of 50° C. to 400° C. The developing agents can be selected from the group consisting of natural and synthetic tannins.

The invention consists in methods of use, methods of preparation and the products themselves whether in the form of compounds, compositions, sheets or films. Examples include no carbon required paper, transparancies for overhead projectors etc.

BRIEF DESCRIPTION OF THE DRAWINGS

Some preferred form of the present invention will shown with reference to the accompanying drawings in which.

DETAILED DESCRIPTION

Figure 1:
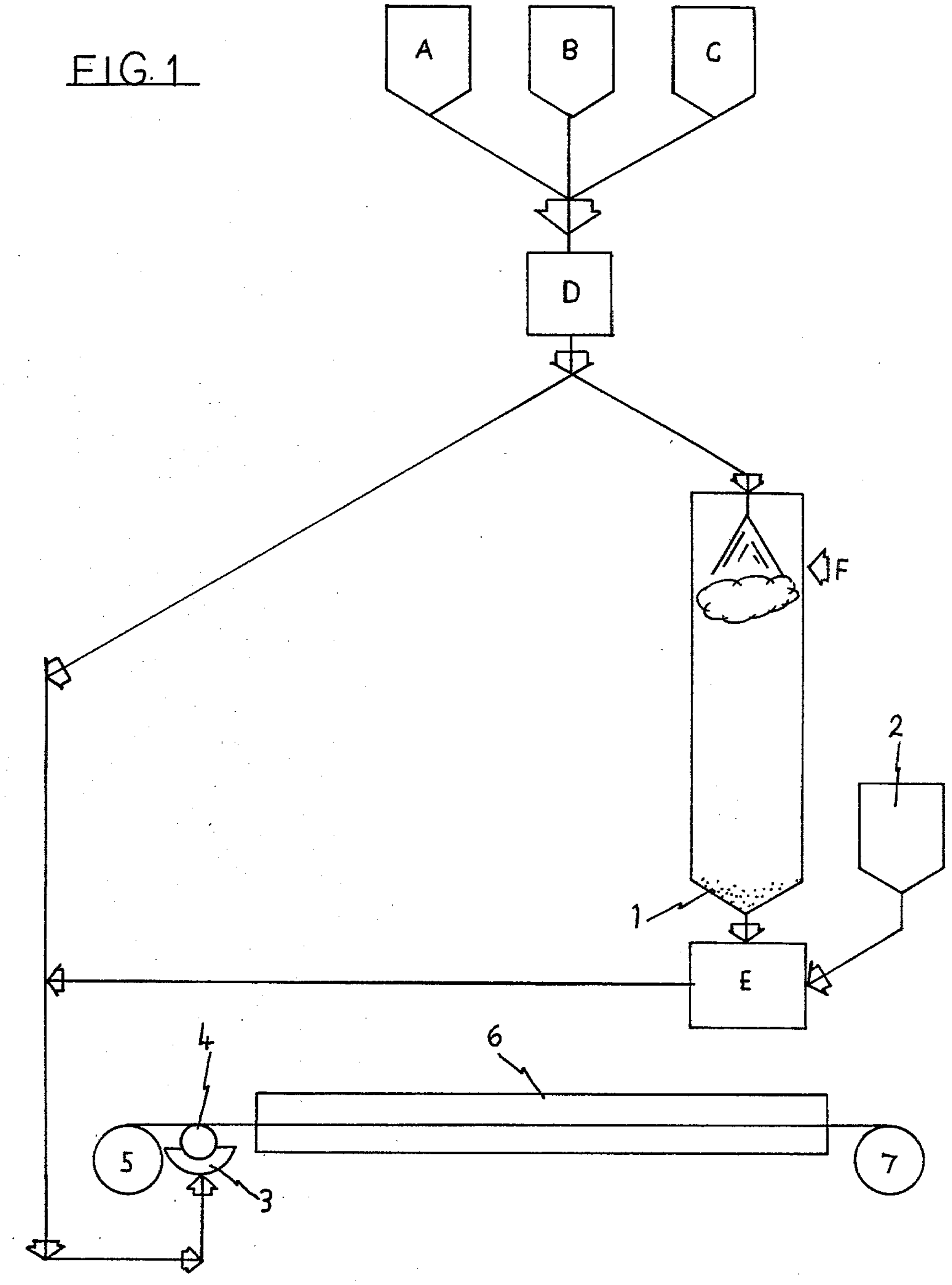
FIG. 1 is a schematic line flow illustration demonstrating two methods of manufacture.

Virtually all published work to date on the use of dye precursors in various forms of copying have made use of leucocyanides, lactams, benzypyrans and etc. The major problem with these materials at least as regards the means of producing a permanent image is that these reactions are reversible. Therefore while various means are known to reduce the dye from the free base to the coloured form, it appears to be impossible to stop the reversible reaction. For example, Harris, Kaminsky & Simard suggested the following mechanism for the reversible reaction of malachite green cyanide.

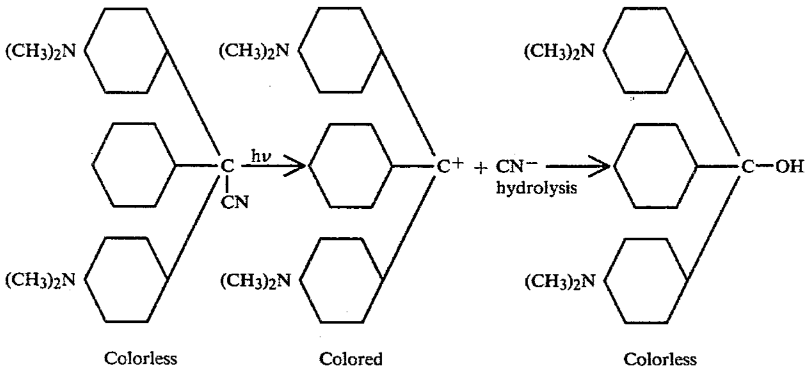

(8)

National Cash Register overcame the above problem by using benzol leuco methylene blue which produces its colour by gradual oxidation. However, this reaction takes some months to occur therefore it must be used in conjunction with one of the aforementioned transient precursors. Secondly this system is limited to a blue colour when a permanent colour is required.

With this background it was with some interest that it was noted that a certain group of solvent dyes would dissolve in very small quantities in certain solvents and in an amount normally classified as very slightly soluble yet this small amount while not colouring the solvent produced a very strong colour when poured onto paper.

The definition of the term "solvent dyestuffs" is given in the Colour Index 2nd edition 1956, Volume 2 from pages 2815 onwards. The acid forms of certain acid dyes do not work in the present invention and are of no further interest (although Ciba-Geigy cover these dyestuffs in two British Patents 1,307,382 and 1,317,411). The dyes used in the present invention are the free base forms of certain basic dyes. These dyes are charactised by being particularly soluble in glycols and fatty acids and being of only very limited solubility in aromatic and aliphatic solvents and oils. Examples of these dyes are Cl Solvent Green 1 & 2-Cl 42000 B; Cl Violet 8-42535B; Cl Violet 9-42555 B; Cl Red 49-45170 B; Cl Solvent Orange 3-11270 B; Cl Solvent Yellow 34-Cl 41000 B.

These dyestuffs have been used for many years to produce typewriter ribbons and carbon papers. However they have always been dissolved in glycols, oleic acid, carnauba wax, etc.

Upon noting that these dyestuffs could be possibly employed in a colourless form a first trial was to produce a pressure sensitive copy sheet by the following method:

| | | |
|---|---|---|
| Solvent | Halowax 1000 (chlorinated naphthalene) | 20 gms |
| Dye Base | Rhodamine Base FB | 0.5 gms |
| Binder | Paraffin Wax | 79.5 gms |

The Rhodamine Base F.B. was dissolved in the Halowax 1000 which was in turn added to the molten paraffin wax. This was in turn coated onto paper which had previously been subcoated with gum arabic. The gum arabic sub coat was essential to prevent the Halowax 1000 and Rhodamine Base from reacting with the paper during coating.

As alternative solvents chlorinated biphenyls, paraffin oils, phthalate esters and non acid containing vegetable oils were successfully used.

As alternative binders the paraffin wax was successfully replaced with polythene, polybutene, polyisobutene and wax mixtures thereof, and also microcrystalline and ceresin waxes.

While any of the aforementioned sheets were capable of transferring a colourless coating which developed colour upon contacting an acid paper the gum arabic coating produced a paper which would curl with changing humidity. Other water soluble resins such as polyethylene oxide, hydroxy ethyl cellulose etc. were tried but none was as good a barrier as gum arabic.

Another problem with the above was that chlorinated biphenyls and napthalenes were being recognised as serious pollutants. The line of thinking was shifted and a close look was then taken at the requirements of the solvents. It was eventually defined that the solvent requirement was for weakly hydrogen bonded solvents commonly known to resin formulators as Class 1 solvents (ASTM) and including aromatic, aliphatic, chlorinated and nitrohydrocarbon solvents.

To maintain the dyestuff in a colourless form i.e. as the free base the binder or resin should not contain free acid or polar groups and must also be soluble in Class 1 solvents. This group includes acrylic, polystyrene, ethyl cellulose, EHEC, chlorinated rubber and rubber hydrochlorides, saturated polyesters and copolymers and terpolymers of PVC, PVA, vinyl toluene, butadiene, acrylonitrite and etc. Because of clarity, cheapness and wide solubility range acrylic, polystyrene and copolymers thereof are the preferred resins.

Having found that it was possible to stabilise the non intensely coloured free bases in a wide range of resins attention was next paid to thermal activated systems. For this the following formula was first tried:

| | | |
|---|---|---|
| Toluol | 40 | gms |
| Vinalak 5911 (Polymethyl/ butyl acrylate) or Tyril 867 (styrene acrylic resin) or Paraloid B 72 | 6.4 | gms |

To produce different colours the following cationic solvent dyes were used:

| | | |
|---|---|---|
| Red | Rhodamine Base | 1% |
| Blue | Victoria Blue Base | 1 |
| Dk. Blue | Malachite Green Base | 1.2 |
| | Rhodamine Base | 1 |
| Green | Malachite Green Base | 1 |
| Black | Rhodamine Base | 1.4 |
| | Malachite Green Base | 0.8 |
| | Auramine Base | 0.8 |
| Yellow | Auramine Base | 1 |

Naturally other colours can be produced by simple colour mixing although for thermal use nigrosine base must be avoided since this dye has a strong absorption of infra-red and this would produced erroneous images.

The dyestuffs are simply stirred into the toluol/Vinalak mixture and within a ½ hour the dye will be dissolved into a faintly coloured solution. This can be coated onto a transparent film such as cellulose acetate or polyethylene terephthalate at a thickness of around 0.0001" (not critical). The dried film will be colourless or nearly so depending on the choice of resin or the percentage of dyestuff used. Obviously the amount of dyestuff used can be varied depending on the type of solvent and/or resin used but is preferably from 1 to 80% and ideally from 10 to 30% by weight of the overall solids composition. Also some resins produce a slightly stronger background colour which may be undesirable in some instances.

To develop an image onto this film another film was coated with an organic acid reducing compound. An essential property of the acid coating was that it should melt, sublime or decompose preferably at a temperature of between 50° C. to 400° C. Secondly, the acid reducing compound should be compatible with or should be able to penetrate the resin used to dissolve the dye.

For this two sheet process various compounds which would sublime were looked at. The following were successfully tried:

| | | | |
|---|---|---|---|
| pyrogallol | oxalic acid<br>maleic acid<br>a-napthol | benzoic acid<br>acetic acid<br>b-napthol | thiourea |

Since some of these materials are not acids it is apparent that the colour development is due to a reduction reaction. The choice of acid/reducing agent depends on the temperature that is required for producing an image. For example to produce an image on a typical commercial thermal copier it was found that oxalic acid, benzoic acid and salicylic acid were suitable. A small amount of resin is added to help the acid/reducing agent adhere to the substrate. A typical formula is as follows:

| | | |
|---|---|---|
| Ethanol | 80 | gms |
| Polyvinyl Butyral Resin | 4 | gms |
| Salicylic Acid | 12 | gms |

The drying of this coating is important and must be done quickly to prevent the growth of large crystals which affect the sharpness of the image.

To develop a thermal transparency consisting of a single sheet non-subliming acid/reducing substances were investigated. It was essential to use nonsublimable materials since sublimation would cause premature development of the transparency. Tried the following were successfully tried:

| | |
|---|---|
| Colophony | Oleic Acid |
| Tannic Acid | Succinic Acid |
| Citric Acid | Tartaric Acid |
| Sorbic Acid | Ascorbic Acid |
| The following produced no image: | |
| Phosphoric acid | hydrochloric acid |

Therefore the following is an example of a single sheet thermal transparency:

| Colourless Dye Coat | | |
|---|---|---|
| Acrylic B72 | 6 | gm |
| Toluol | 40 | gm |
| Rhodamine Base | 0.5 | gm |

The Acryloid B72 is dissolved in toluol at 50° C. and the Rhodamine Base is dissolved into the resin solution. The solution is then coated onto polyethylene terephthalate film at a dried coating thickness of 0.0001". Next an acid/reducing coating is prepared:

| | | |
|---|---|---|
| Ethanol | 80 | gms |
| Ethyl Cellulose N200 | 10 | gms |
| Tannic Acid | 10 | gms |

This solution is coated on top of the free base coat at a dried coating thickness of 0.0001". Exposure of the above sheet with a black original in a thermal copier will produce a red image.

It is important that the solvent of the acid/reducing coating is not a solvent for the resin in the colourless dye coat otherwise the colour will develop during coating.

The failure with the above coating is that the ethyl cellulose is a thermoplastic resin and this may cause this coating to fuse to the original. Eventually the tannic acid will react with the ethyl cellulose and convert this to a thermosetting resin; however to accelerate the process phosphoric acid may be used which will react with the ethyl cellulose but won't produce an image. Other resins which may be used are:

| | | |
|---|---|---|
| | CAP | Polyvinyl Butyral |
| | CAB | P.V.P. |
| | PVP/VA | U/F |
| | Urea Melamine | Polyamide |
| Nylon | Polyurethane | Polymide/Epoxy |

Also for this coating water soluble and dispersible resins have been successfully tried, e.g.:

| | |
|---|---|
| Hydroxyethyl Cellulose | PVP |
| Polyurethane dispersions | |
| PVA dispersion | |
| Polystyrene dispersions | |
| Acrylic dispersions | |

The preferred dispersions are the polyurethane and acrylic dispersions.

In all of the aforementioned work the following seemed essential or necessary to the invention:

| | |
|---|---|
| * | Dyestuffs as defined |
| * | Solvents as defined i.e. preferably non polar and no free acid groups |
| * | Resin or binder as defined i.e. preferably non polar and no free acid group and soluble in Class 1 solvents |

The choice of acid reducer or reducer is not critical and depends on the end use or the temperature that is required to produce the image; however it is believed that the system described offers the widest choice of acid reducer or reducing agents of any system hitherto described.

The next aim was to produce a reaction type carbonless copy paper. Previous attempts at producing this have failed in shelf life as the resins used were moisture sensitive and moisture eventually developed the dyestuff. Since the transparencies were completely resistant to water, it was thought that the use of their coating composition could overcome the above problem. However, when the standard transparency solution was applied to bank paper, the acid content of the paper immediately developed the dye. Next the undercoating paper with Alcostat and gum arabic (from water solutions) was tried. This successfully prevented the dyestuff from reacting but had some background colour and introduced another coating. In an attempt to develop a pressure and thermally sensitive copy paper, a copy sheet consisting of a coated front of colourless dye/acrylic and a coated back consisting of an encapsulated solvent acid mixture was next envisaged. This overcame the problems of encapsulating a water sensitive dye mixture. However, still it became necessary to introduce a third coating. It was therefore to the development of such a paper that would not need an extra coating that attention was next paid. As the transparency coating is completely unaffected by water or alcohol, attention was paid to the spray drying of the standard transparency formula. Such a standard transparency formula would comprise by way of example:

| | |
|---|---|
| Styron P.S.3 (Polystyrene Resin) | 6 gms |
| Rhodamine Base F.B. | 0.8 gms |
| Toluol | 40 gms |

The spray dried powder was predicted to be almost colourless and be able to be mixed with a water based resin or alcoholic soluble resin for coating. It next thought possible to mix into the same coating the acid or reducing compound which would make the sheet thermally active. For pressure sensitive sheets the coated back would only require a solvent (which would dissolve the acid) to be encapsulated. To produce such paper a thermally active and pressure sensitive coating composition of the type just exemplified was spray dried. This was effected by placing the solution into a spray gun and spraying the same into a warm draught of air.

The powdery residue obtained was collected. Alternatively, the solution may be dried in an evaporating dish and crushed and ground down to a fine particle size. The fine powder obtained from either method is very faintly pink in colour.

The powder obtained was next mixed with water and a water soluble or dispersible resin. The spray dried material could be mixed for example with any of natural gums (e.g. gum arabic), gelatine, cellulose resins (e.g. C.M.C., methyl cellulose, etc), polyvinylalcohol, polyvinyl acetate and acrylic dispersions. A small amount of filler was added to maintain whiteness and to produce a paper capable of being written on by conventional methods. Next a reducing compound or reducing acid compound was added to the mixture after which it was coated onto paper. For example, we tried the following:

| | |
|---|---|
| Styron/Rhodamine Base Powder | 50 gms |
| Water | 70 |
| Acrylic Dispersion/or Polyox | 10 |
| Benzoic Acid | 5 |
| Calcium Carbonate (white filler) | 10 |

When this mixture was coated on paper and dried, the paper was subjected to localised heating of approximately 120° C. The paper turned red wherever heat was applied. Furthermore a red colour was formed wherever a solvent such as toluol, MIBK, MEK Xylol, and etc. was applied.

Alternatively an alcohol soluble resin could be used e.g. polyamides, cellulose butyrates and propionates etc, polyvinylbutyrates, pyrollidones, etc, and polyurethanes. Obviously the choice of carrier resin is dependant on the end use and hence should not be considered as critcal.

Therefore to produce a pressure sensitive sheet a solvent such as xylol needs to be microencapsulated and coated onto another sheet of paper. When the two sheets of copy are brought together face to face any pressure applied would break the capsules and release the solvent to selectively mobilise the organic acid and/or the free base/resin powder. An image will be formed in this area. The process for encapsulating water insoluble materials is a known process.

By replacing the acrylic dispersion in the previous example with a conductive resin such as 'Alcostat' (Reg. trade mark of Allied Colloids) it is possible to produce an image by electrical discharge.

Considerable attention was then paid to the development of a single ply thermal transparency making use under selective temperature, of alterations to the mobility of the developing agent.

The use of sublimable, aromatic organic acids to develop various dye precursors is well known having been described in U.S. Pat. No. 2,770,534. While aromatic organic acids work in a 2 ply thermal transparency they suffer two major problems when they are used for single ply transparencies. Firstly, the acids are crystalline materials and crystallise in most coatings producing semi-opaque coatings (no good for transparencies). Secondly, aromatic acids tend to sublime or decompose which since the dye precursor or dye base coating cannot be separated physically from the acid reactant, will eventually cause an unwanted premature colour reaction.

In an attempt to overcome the problem of crystallisation U.S. Pat. No. 3,594,208 suggests the use of a polymeric plasticiser to retain the acids in solution. For example, a resin internally plasticised with butyric acid was claimed to be successful. However, while this may slow down the rate of crystallisation it seldom entirely prevents it. Furthermore it does not prevent sublimation of the acid and the subsequent premature colour reaction.

U.S. Pat. No. 3,669,747 shows an attempt to prevent the premature colour reaction by producing an adduct of the organic acid and an amine. While this may well prevent the premature colour reaction it does not prevent the crystallisation of the developing agent.

Both U.S. Pat. Nos. 3,914,510 and 3,965,282 tell of attempts to use acid reactants which are less likely to sublime and to crystallise and while the use of sulphonic acids or phthalic acids may slow down the rate of crystallisation or sublimation these events still occur and this limits their shelf life.

From information given in the aforementioned patent specifications it is obvious that premature and/or background colouration and crystallisation of the acid developer have presented major problems in the development of a single ply or integral thermal transparency.

Therefore one of the next objects was to find a group of organic acids which were non-crystalline, would not sublime at normal temperatures and yet would melt, sublime or decompose at temperatures above 80° C.

While searching and trying the various acids and acid resins one group of materials stood out over the rest. This group included the natural and synthetic tannins. Tannins had the advantage that they were amorphous powders, stable at normal temperatures and yet will react with solvent dyes above 80° C.

When the tannins were used as developing agents they produced further advantages to those already envisaged. They tannins produced completely clear coatings which had no tendency to crystallise. They have also provided coatings which are very stable and have little tendency to produce background colour development. While these last two results were expected it was also found that tannin developers also produced exceptionally sharp images and also that these images had little tendency to sublime during storage.

Prior to the discovery of the use of tannins the images for thermal transparencies had been developed with various sublimable organic aromatic acids. The sublimable developers produced a very faint "halo" around the image areas which reduces their sharpness. Furthermore the images so produced also had a tendency to sublime with the dyestuff and although the use of solvent dyestuffs prevented the dye from reverting to its colourless form, nevertheless this property could prove to be annoying when the transparencies were stored together or with other plastic films. The subliming images were able to pass through paper and develop on certain other films.

Chemically the tannin group is difficult to define. Tannic acid of natural origin is a complex polyphenolic while the synthetic tannins are produced by the condensation of the sulphonic acids of the higher hydrocarbons, and of phenols and cresols with formaldehyde. Although for present purposes the synthetic tannins have been classified as polyacid formaldehydes their main distinguishing property is to render proteins insoluble. Therefore to provide a workable definition it is convenient to define suitable tannins as natural or synthetic products capable of rendering proteins insoluble, being either amorphous powders or having a poorly defined crystal structure and having a melting range or decomposing range within temperatures of between 70° C. to 250° C.

Suitable materials include tannic acid, lignins, corilagins, catechins and etc. and also the following commercial products, Printan G (a product of Ciba Geigy) Mesitol BN, Mesitol GD, and Mesitol GDN, (products of Bayer) Tanfix AL (product of Hoescht) and etc.

The tannins preferably make up between 5% to 75% by weight of the developer coating or matrix.

With reference to the drawings FIG. 1 is a schematic line flow illustration demonstrating the two methods of manufacture The solvents (A), resins or binders (B), and free base of a cationic solvent dye (C) are mixed together in the desired proportions as described, until dissolved in a mixer (D). At this stage the resulting solution can either be coated directly onto a substrate or it may be spray dried. In the former case the solution from mixer 1 is transferred to a tray, 3 and a rotating roller, 4 transfers a proportion of the solution onto a substrate 5. The solvent is removed from the coated solution by passing through a drying tunnel 6 after which it is rewound on cores 7.

When it is desired to use the composition in a particulate form, the solution from mixer D is transferred to a spray dryer F which removes the solvent from the spray by a counter-current draught of warm air. The resultant particulate matter, 1 is mixed with a binder or carrier 2 in a mixer E after which it is transferred to the coater tray 3. Thereafter the coating method is the same as that previously described.

Figure 2:
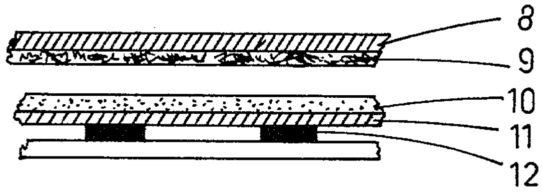
FIG. 2 shows a 2 ply thermographic image transferring element, FIG. 3 refers to a single ply thermographic image transferring element.

FIG. 2 refers to a 2 ply thermographic image transferring element wherein the printed image, 12 converts infra red radiation to heat. The heated areas cause the developer agent 10 which has been coated on a substrate 11 to sublime and react with the free base coating, 9 thereby causing the colour to develop in those areas corresponding to the printed image. Layer 8 is simply a support or substrate for coating 9.

Figure 3:
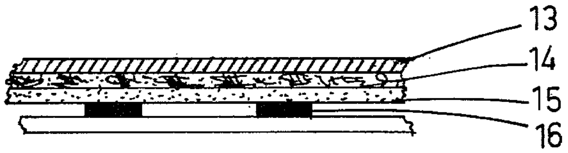

FIG. 3 refers to a single ply thermographi image transferring element wherein the substrate 13 is coated with an undeveloped dye mixture 14 which is in turn coated with a coating containing a developing agent 15. Infra red radiation causes the printed image 16 to heat up causing the developing agent in coating 15 to melt or decompose and thereby react with the undeveloped dye in coating 14.

Figure 4:
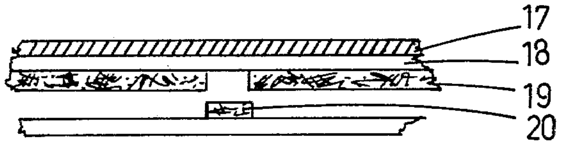
FIG. 4 shows a pressure sensitive transfer copying element.

FIG. 4 represents a pressure sensitive transfer copying element. The substrate 17 is coated with an oleophobic coating 18 such as gum arabic. A second coating 19 is applied onto coating 18. Coating 19 consists of a frangible layer, e.g. paraffin wax, containing within the interstices a colourless dye solution, e.g. rhodamine base solvent dye dissolved in chlorinated napthalene. Pressure exerted on substrate 17 causes the frangible layer 19 to transfer to paper at 20. The same pressure also causes the free base solution to exude onto the paper wherein the free base reacts with either the acid or polar components of the paper to form an image.

Figure 5:
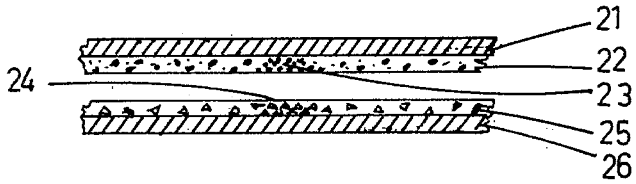
FIG. 5 shows an alternative pressure sensitive 2 ply copying element.

FIG. 5 represents a further pressure sensitive 2 ply copying element whereby a substrate 26 is coated with a layer 25 containing particles of the free base of a cationic solvent dye/resin or binder mixture and where the solvent has been completely or substantially removed by for example spray drying. The second ply consists of a substrate 21 coated with a layer 22 which contains microcapsules of the developing agent held in liquid form by a solvent. Said solvent is or contains a solvent which is a true solvent for the spray dried particles contained in coated 25. Alternatively the solvent encapsulated in layer 22 may be a polar solvent which is itself a developing agent.

The image 24 is formed by applying pressure to the substrate 21 over region 23 which causes the capsules of solvent and developing agent to rupture thereby releasing the developing agent to react with the free base/binder particles in layer 25.

Figure 6:
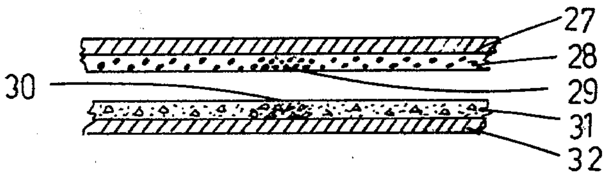
FIG. 6 shows still a further 2 ply pressure sensitive copying element.

FIG. 6 represents a still further pressure sesitive 2 ply copying element wherein the substrate 32 is coated with a layer 33 which has dispersed within it both the particles of free base/resin or binder as described in FIG. 1 and particles of a developing agent. The image 30 is formed by applying pressure to the substrate 27 causing a solvent, e.g. xylol to be exuded from the ruptured microcapsules 29 contained in coating 28, to be transferred to coating 31 thereby allowing the free base and the developing agent to react and form a colour.

Figure 7:
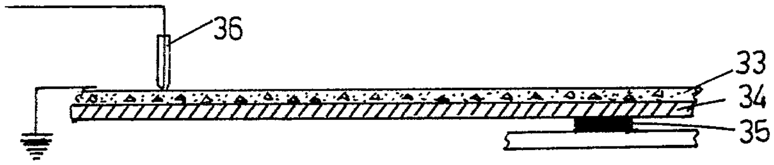
FIG. 7 shows yet a further variation.

A further variation of the image forming sheet described in FIG. 6 will become evident by referring to FIG. 7. In this case the coating 33 is similar to coating 31 as already described except a developing agent is chosen which will melt at between 80° C. and 200° C. and the binder which holds this coating onto the substrate 34 should preferably be conductive. Alternatively the substrate 34 could be conductive.

If a stylus 36 is brought into contact with the coating 33 and an electric current is passed through the stylus an image will be formed in the area by electrothermic means. Furthermore a thermographic image can be formed by contacting a black printed image 35 against the substrate 34. Infra red radiation causes the image 35 to heat up thereby raising the temperature of the corresponding area of layer 33. This causes the developing agent to melt and react with the free base/binder particles.

It will be obvious on the basis of the foregoing that an image transferring sheet produced by the above process will have a wide application. As a pressure sensitive sheet it could be used for general office stationery and as a thermal activated sheet it could be used as calculator and computer print-out sheets and when developed by an electric current would have a wide application for fascimile equipment.

To summarise compositions, the present invention uses the free bases of cationic dye stuffs which have the following advantages over chemically modified bases which have hitherto been used:

(1) They are considerably cheaper;

(2) They have greater stability in the binder or resin binder system;

(3) They will develop colour with a far greater range of acid and/or reducing agents; and selection of organic acid developing agents such as Tannic Acid or Phosphomolybdic Acid will produce colours of very good light fastness; and (4) They do not suffer the reversible reactions of the chemically modified dye bases which will produce fading quite rapidly regardless of storage conditions.

What I claim is:

1. A color developer composition comprising a free base of a cationic solvent dye in $OH^-$ form, said dye being capable of developing a color or a more intense color upon reaction with an organic acid developing agent; a binder selected from the group consisting of waxes and resins which (1) are non-polar and non-acid, (2) do not develop said free base and (3) are soluble in Class 1 (ASTM) solvents; and a substantially non-polar solvent for both said binder and said free base, which solvent (1) does not develop said free base, (2) is weakly hydrogen bonded and (3) is classified as a class 1 (ASTM) solvent.

2. A composition as claimed in claim 1 wherein said binder is a resin selected from the group consisting of acrylic, polystyrene, ethyl cellulose, ethyl hydroxyethyl cellulose, polythene, chlorinated rubber, rubber hydrochloride, polyesters, polyvinyl chloride, polyvinyl acetate, vinyl toluene, butadiene, acrylonitrile and copolymers thereof.

3. A composition as claimed in claim 1 wherein said free base comprises from 1 to 80% by weight of the overall solids composition.

4. A composition as claimed in claim 3 wherein said free base comprises from 10 to 30% by weight of the overall solids composition.

5. A composition as claimed in claim 1 wherein said non developing solvent has been substantially removed by spray drying which leaves the composition in a particulate form.

6. The composition as claimed in claim 1 wherein said carrier includes an organic acid developing agent for said substantially free base, said organic acid being one which melts or sublimes in the temperature range of from about 50° C. to about 400° C.

7. The combination as claimed in claim 6 wherein a filler is included in said carrier which will have the effect upon the combined composition and carrier being applied to a substrate of providing a surface capable of being written on subsequent to the substantial removal of substantially all solvents therefrom.

8. The composition of claim 1 wherein said free base in $OH^-$ form is the free base of a cationic solvent dye selected from the group consisting of diphenylmethane, triarylmethane, xanthene, azo, azine and phenazine dyes.

9. The composition of claim 8 wherein said triarylmethane is triphenylmethane.

10. The composition of claim 1 wherein said solvent is an aromatic, aliphatic or chlorinated hydrocarbon.

11. A composition comprising, in combination, (I) a color developer composition comprising a free base of a cationic solvent dye in $OH^-$ form, said dye being capable of developing a color or at least a more intense color upon reaction with an organic acid developing agent and a binder selected from the group consisting of waxes and resins which (1) are non-polar and non-acid, (2) do not develop said free base and (3) are soluble in class 1 (ASTM) solvents, said binder having been mixed with said free base in the presence of a solvent for them both, which solvent (1) does not develop said free base, (2) is weakly hydrogen bonded and (3) is classified as a class 1 (ASTM) solvent; and (II) a carrier therefor which is selected from the group consisting of a resin dispersion and a resin solution in which said composition defined in (I) is substantially insoluble.

12. A color developer composition comprising a free base of a solvent dye in $OH^-$ form selected from the group consisting of azo, xanthene, triarylmethane, diphenylmethane, azine and phenazine dyes, which is capable of developing a color or a more intense color upon reaction with an organic acid developing agent; a binder which does not develop the said free base and which is selected from the group consisting of (1) a resin selected from acrylic, polystyrene, ethyl cellulose, ethyl hydroxyethyl cellulose, polythene, chlorinated rubber, rubber hydrochloride, polyesters, polyvinyl chloride, polyvinyl acetate, vinyl toluene, butadiene, acrylonitrile and copolymers thereof, and (2) a wax selected from paraffin waxes, microcrystalline waxes, polyethylene waxes and ceresin wax, said binder having been mixed with said free base in the presence of a solvent for both said free base and binder, said solvent being non-polar and containing no free acid groups.

13. The composition of claim 12 wherein when said binder is a resin, said solvent is a weakly hydrogen bonded solvent comprising an aromatic, aliphatic or chlorinated hydrocarbon, and when said binder is a wax, said solvent is a paraffin oil, a chlorinated paraffin, a naphthalene, a biphenyl or a phthalate ester.

14. The composition of claim 12 wherein said triarylmethane is a triphenylmethane.

* * * * *